9/22/81 XR 4,290,473

United States Patent [19]

Pierson et al.

[11] 4,290,473

[45] Sep. 22, 1981

[54] APPARATUS FOR CONTROLLING LIGHT TRANSMISSION THROUGH A WINDOW

[75] Inventors: James G. Pierson, Longueuil; David A. Wilmshurst, St. Catherines, both of Canada

[73] Assignee: Queen's University at Kingston, Kingston, Canada

[21] Appl. No.: 6,112

[22] Filed: Jan. 24, 1979

[30] Foreign Application Priority Data

Jan. 25, 1978 [CA] Canada .................................. 295640

[51] Int. Cl.[3] .......................... A47G 5/02; G02B 5/22

[52] U.S. Cl. .................................. 160/120; 160/241; 350/314

[58] Field of Search ....................... 350/314, 315, 268; 296/97 F, 97 G; 160/120, 237, 241

[56] References Cited

U.S. PATENT DOCUMENTS

| | | | |
|---|---|---|---|
| 2,280,358 | 4/1942 | Tietig | 160/237 |
| 2,281,022 | 4/1942 | Cavanaugh | 160/237 |
| 2,702,081 | 2/1955 | North et al. | 160/120 |
| 3,056,626 | 10/1962 | Browne | 350/314 |
| 3,183,033 | 5/1965 | Stulbach | 350/314 |
| 3,236,290 | 2/1966 | Lueder | 350/314 |
| 3,603,672 | 9/1971 | Bastide | 350/314 |
| 3,746,429 | 7/1973 | Spindel et al. | 350/314 |

*Primary Examiner*—Alfred E. Smith
*Assistant Examiner*—Carolyn E. Field
*Attorney, Agent, or Firm*—Lowe, King, Price & Becker

[57] ABSTRACT

A device for controlling light transmission through an opening in which a pair of spaced planar parallel films are placed adjacent an opening. The films are selected to have uniformly and linearly varying light transmitting characteristics and are designed to be moved relative to each other, generally in opposite directions, so that a substantially uniform degree of light transmission is achieved over the entire opening area. The films may be either absorptive or reflective and the films may be moved manually or electrically and automatically in response to a sensing and control device.

9 Claims, 6 Drawing Figures

APPARATUS FOR CONTROLLING LIGHT TRANSMISSION THROUGH A WINDOW

This invention relates to a light transmission control device which is particularly suitable for controlling light transmission through a window into a building or the like.

It is, of course, known to employ tinted and or reflective glass in windows in order to reduce light transmission and hence reduce light intensity in a room. It is also known to employ a tinted or reflective screen in conjunction with a clear glass window for the same purpose. While such systems are very effective in reducing light intensity to a selected proportion of the light incident on the window, dependent upon the degree of tinting selected, they do not permit control of light intensity to a preselected level over a range of incident light intensities. Thus, while the transmitted light intensity may be acceptable in mid-afternoon on a sunny, summer day, a room may well be too dark at a similar time on a sunny mid-winter day when the sun's rays strike at a lower angle, or too bright at noon on a sunny summer day. It is, therefore, desirable to be able to control the transmitted light intensity in a room over a range of incident light intensities. Systems to effect such control have heretofore included mechanically driven screen systems of the venetian blind type and specially formulated glasses whose transmission characteristics vary depending upon the incident light intensity. Such systems are inevitably relatively costly and not without their disadvantages.

An object of the present invention is to provide a relatively simple, inexpensive, mechanical means to control transmitted light intensity into a room or the like.

By one aspect of this invention there is provided a device for controlling transmission of light through an opening, comprising:

(a) two lineal strips of film material having varying light transmission characteristics longitudinally along at least a selected length thereof, said films being (i) disposed in overlying relationship over an area corresponding at least to the area of said opening and (ii) extended beyond said area; and (b) means for linearly moving one film strip relative to the other in said overlying relationship and in said area, whereby the amount of light transmission over said area is dependent upon the relative light transmission characteristics of said two film strips.

The invention will be described in more detail with reference to the accompanying drawings in which.

Figures 1, 2, 3, 5, 6:
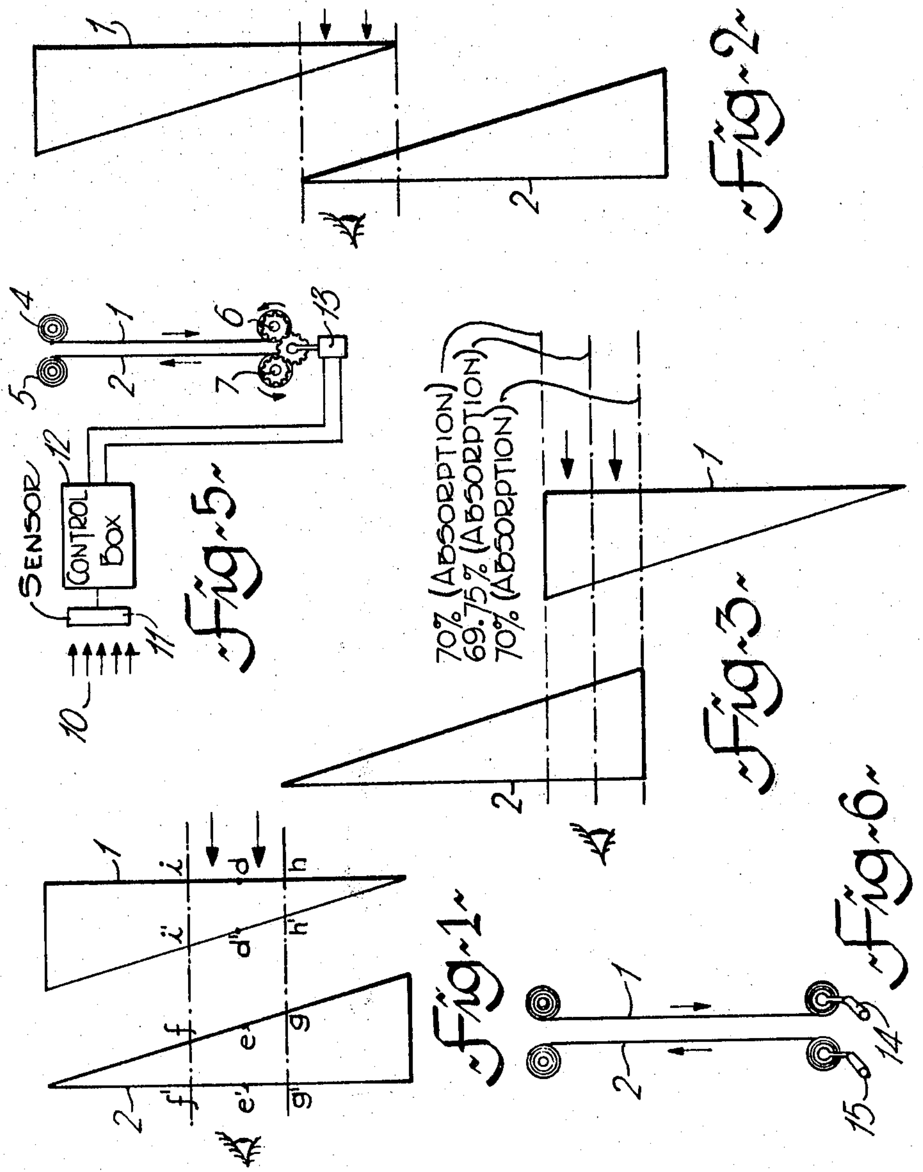
FIG. 1 is a schematic representation of a pair of films according to the present invention shown at a midpoint along their length.
FIG. 2 is a schematic representation, similar to FIG. 1, of the films at the "low" end thereof.
FIG. 3 is a schematic representation, similar to FIGS. 1 and 2, of the films at the "high" end thereof.
FIG. 5 is a schematic diagram illustrating a preferred control mechanism for the embodiment illustrated in FIG. 4.
FIG. 6 is a schematic diagram illustrating an alternative embodiment of the invention.
Figure 4:
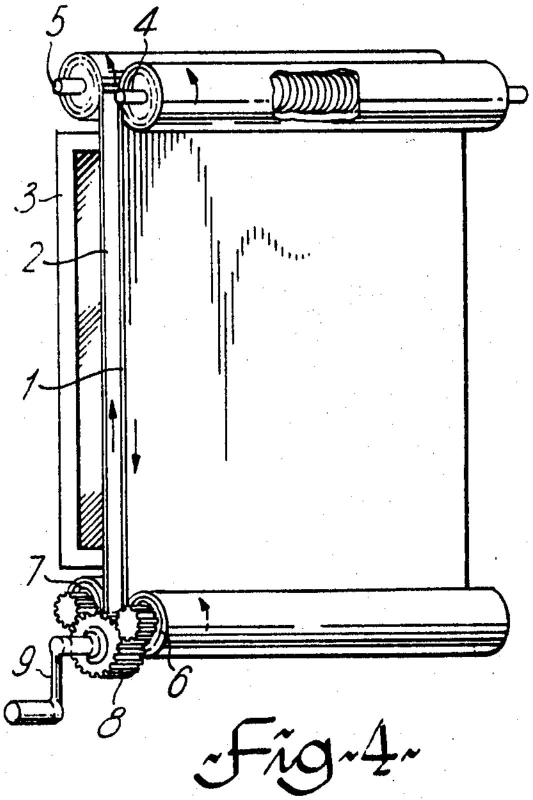
FIG. 4 is an isometric view of a preferred embodiment of the present invention.

Turning firstly to FIG. 1, there is shown a diagrammatic representation of two transparent flexible plastic films 1 and 2, each tinted increasingly in one direction. As each film is progressively darker, preferably on a linear basis, from one end to the other it is convenient to represent each film as a triangle in which the apex represents the end of the film having no tinting, i.e. clear, while the base of the triangle represents the end of the film having maximum tint, i.e. maximum absorption of light. In practice, the tinting may vary between 0% and 50-60%. For convenience of the present discussion, reference will be made only to tinting of films whereby light is absorbed by the films but it must be clearly understood that the invention is not limited thereto and is to be construed to include light reflective films as will be discussed in more detail hereinafter. The length of the films for a selected window installation depends generally upon the window length relative to the increase of tint level per window length and is always longer than the length of the window. For convenience, the tint level may increase by 10% per window length and usually a film is designed to run between 0% and 50% tint over its length. Thus, for a 4 foot high window, the preferred films will be 20 feet long. As shown in FIGS. 1 and 4 the films 1 and 2 are spaced from a window 3 by a distance of approximately 1-2 cms. and 0.25-0.75 cms. apart in planes parallel thereto. Film 1 is oriented with the tinted end uppermost and film 2 is oriented with the tinted end down. It will, of course, be appreciated that the film orientation is a matter of choice and may be reversed if desired. At a point d-d' and e-e', film 1 will absorb, say, 25% of the light incident thereon and film 2 will absorb 25% of the light transmitted through film 1. Thus, in the middle of the window the amount of light transmitted through the window and the two films is:

$$\text{Amount of light transmitted \%} = (100 - T_1) - \frac{(100 - T_1)\,T_2}{100}$$

$$= (100 - T_1)\left(1 - \frac{T_2}{100}\right)$$

where $T_1$ = % amount of light transmitted by film 1 and $T_2$ = % amount of light transmitted by film 2, $$\text{thus } (100 - 25) - \frac{(100 - 25)25}{100}$$

$$\text{or } = (100 - 25)\left(1 - \frac{25}{100}\right)$$

$$75 \times .75 = 56.25\%$$

and conversely the amount of light absorbed is $$100 - 56.25\% = 43.75\%.$$

At the top of the window film 1 (at i-i') absorbs 30% of the light transmitted through the window, if the tint increases uniformly 10% over one window length and film 2 (at f'f) absorbs 20% of the light transmitted through film 1.

$$\text{Thus \% light transmitted} = (100 - 30)\left(1 - \frac{20}{100}\right)$$

$$= 70 \times .80$$

$$= 56\% \text{ and light absorbed} = 44\%.$$

A similar computation holds for the bottom of the window at g-g', h-h'. Thus there exists a spherical light transmission curve across the window surface viewed by an inside observer, and the total deviance from a uniform tint is only 0.25% which is not discernible to the human eye.

If the two films are moved in opposite directions to each other, relative to the window, to the position as shown in FIG. 2, there is provided a position of minimum tint (approximately 9.75%-10% absorption) which is uniform across the whole window length by the same logic as applies with respect to FIG. 1.

Similarly, if the films are moved in the opposite direction, as shown in FIG. 3, a position of maximum absorption (approximately 69.75-70.0%) is achieved.

FIG. 4 illustrates a practical embodiment of the present invention. Films 1 and 2, conveniently 5-10 mil. polyester film such as that sold under the Trademark "Mylar" (polyethylene teraphthalate) are spaced in parallel planar relationship with a window 3. Films 1 and 2 are spaced approximately 1-3 cms. from the window 3 and are about 0.5-1 cm. apart. Each film is provided with spring loaded take-up roller 4, 5, respectively at the top thereof and a feed roller 6,7 respectively at the bottom thereof. Feed rollers 6 and 7 are interconnected, as by spur gear 8 to provide a direct mechanical coupling therebetween and eliminate the possibility of slippage as the two films are moved in opposite directions relative to each other. Feed rollers 6 and 7 and spur gear 8 may be driven in any convenient manner, as by hand crank 9 or by powered means such as an electric motor.

It will be appreciated that the movement of the films may be effected automatically, dependent on the amount of light falling on a sensor, such as a photocell or phototransistor, suitably positioned in the room. A suitable control circuit is shown in diagrammatic form in FIG. 5. Light 10 falls upon a sensor 11, which is coupled to a control box 12 which can be preset for any desired light intensity by means of a potentiometer acting as a variable voltage divider between ground and a reference voltage or the like. Sensor 11 may be light or heat sensitive and the output therefrom may be amplified as required. Upon actuation of the control, power is provided to an electric motor 13, which in turn causes feed rolls 6, 7 to rotate in opposite directions, thereby moving films 1 and 2 to a desired position. This description has thus far concentrated upon providing uniform tint across a complete window length, but it will, of course, be appreciated that under certain circumstances it may be desirable to provide a graduated level of tinting across the window and this may be simply achieved by moving films 1 and 2 independently of each other as shown schematically in FIG. 6. FIG. 6 illustrates the films being controlled by separate hand cranks 14, 15 but any control means, hand or power operated may be employed.

It will also be appreciated that most plastics materials and the dyes therefor are relatively unstable under prolonged exposure to sunlight or heat and rather than absorbing the incident light, it may be advantageous to reflect the light therefrom by means of films which are increasingly reflective from one end to the other. Either one or both of the films employed may be reflective rather than absorptive in nature. Reflectivity may be most easily achieved by condensing varying amounts of evaporated metal on the film as required. A preferred metal for this purpose is gold which is particularly reflective for infra-red radiations. Metal thickness is generally 1 micron or less and thus even gold films are economically possible.

We claim:

1. A device for controlling transmission of light through a window comprising:

(a) two lineal strips of roller-mounted film material having light transmission characteristics which vary linearly longitudinally from a maximum at one end to a minimum at the other end thereof, said strips being (i) disposed in overlying spaced parallel planar relationship over an area corresponding at least to the area of the window, (ii) extended beyond said area, and (iii) disposed so that said maximum transmission characteristic end of a first said strip is in juxtaposition with said minimum transmission characteristic end of a second said strip; and (b) means for linearly moving one film strip relative to the other in said overlying relationship and in said area, whereby the amount of light transmission over said area is dependent upon the relative light transmission characteristics of said two film strips and is substantially uniform over said area.

2. A device as claimed in claim 1, wherein said film material is a light absorptive film.

3. A device as claimed in claim 1 wherein said film material is coated with a layer of light reflective material of varying thickness.

4. A device as claimed in claim 1 wherein said film material is coated with a layer of an evaporated metal.

5. A device as claimed in claim 1 wherein said film material is coated with a layer of varying thickness of gold.

6. A device as claimed in claim 1 wherein said means for moving said strips includes means to move said strips linearly in opposite directions.

7. A device as claimed in claim 6 wherein said means for moving said strips is a power means.

8. A device as claimed in claim 7 including sensor means for actuating said power means in response to a signal indicative of light intensity.

9. A device as claimed in claim 6 including means to move both said films without slippage therebetween.

* * * * *